(12) United States Patent
Agrawal et al.

(10) Patent No.: US 8,108,929 B2
(45) Date of Patent: Jan. 31, 2012

(54) METHOD AND SYSTEM FOR DETECTING INTRUSIVE ANOMALOUS USE OF A SOFTWARE SYSTEM USING MULTIPLE DETECTION ALGORITHMS

(75) Inventors: Subhash C. Agrawal, Boxboro, MA (US); Scott M. Wimer, Burlington, MA (US); Jonathan H. Young, Newton, MA (US)

(73) Assignee: Reflex Systems, LLC, Atlanta, GA (US)

( * ) Notice: Subject to any disclaimer, the term of this patent is extended or adjusted under 35 U.S.C. 154(b) by 1844 days.

(21) Appl. No.: 10/967,945

(22) Filed: Oct. 19, 2004

(65) Prior Publication Data
US 2006/0085854 A1    Apr. 20, 2006

(51) Int. Cl.
*G06F 21/00* (2006.01)
(52) U.S. Cl. .......................................................... 726/23
(58) Field of Classification Search ..................... 726/23
See application file for complete search history.

(56) References Cited

U.S. PATENT DOCUMENTS

| | | | |
|---|---|---|---|
| 6,839,850 B1 * | 1/2005 | Campbell et al. | 726/23 |
| 7,069,588 B2 * | 6/2006 | Call et al. | 726/22 |
| 7,162,741 B2 * | 1/2007 | Eskin et al. | 726/25 |
| 7,487,542 B2 * | 2/2009 | Boulanger et al. | 726/23 |
| 2002/0078381 A1 * | 6/2002 | Farley et al. | 713/201 |
| 2003/0051026 A1 * | 3/2003 | Carter et al. | 709/224 |
| 2003/0149888 A1 * | 8/2003 | Yadav | 713/200 |
| 2003/0188190 A1 * | 10/2003 | Aaron et al. | 713/201 |
| 2004/0034795 A1 * | 2/2004 | Anderson et al. | 713/201 |
| 2004/0143756 A1 * | 7/2004 | Munson et al. | 713/200 |
| 2005/0229250 A1 * | 10/2005 | Ring et al. | 726/23 |
| 2007/0107052 A1 * | 5/2007 | Cangini et al. | 726/22 |

OTHER PUBLICATIONS

X. Hoang, J. Hu, and P. Bertok. "A Multi-layer Model for Anomaly Intrusion Detection Using Program Sequences of System Calls", Networks, 2003.*

* cited by examiner

*Primary Examiner* — Gilberto Barron, Jr.
*Assistant Examiner* — Virginia T Ho
(74) *Attorney, Agent, or Firm* — David H. Judson (57) ABSTRACT

A target software system is instrumented to generate behavior data representing a current observation or observation aggregate. A method then determines whether the current observation or observation aggregate warrants a second level examination; preferably, this determination is made by processing the current observation or observation aggregate through a first level detection algorithm that provides a provisional indication of a possible intrusion. If executing the first level detection algorithm indicates that the current observation or observation aggregate warrants a second level examination, the method continues by processing the current observation or observation aggregate through at least one second level detection algorithms to provide a more definite, fine grain indication of a possible intrusion. Multiple algorithms may be executed together within a single examination level, with the individual results then analyzed to obtain a composite result or output indicative of intrusive or anomalous behavior.

23 Claims, 4 Drawing Sheets

METHOD AND SYSTEM FOR DETECTING INTRUSIVE ANOMALOUS USE OF A SOFTWARE SYSTEM USING MULTIPLE DETECTION ALGORITHMS

BACKGROUND OF THE INVENTION

1. Technical Field

The present invention generally relates to detecting the use of software, and more specifically, to the dynamic detection of an intrusive anomalous use of computer software.

2. Description of the Related Art

The literature and media abound with reports of successful violations of computer system security by both external attackers and internal users. These breaches occur through physical attacks, social engineering attacks, and attacks on the system. In a system attack, the intruder subverts or bypasses the security mechanisms of the system in order to gain unauthorized access to the system or to increase current access privileges. These attacks are successful when the attacker is able to cause the system software to execute in a manner that is typically inconsistent with the software specification and thus leads to a breach in security.

Intrusion detection systems monitor some traces of user activity to determine if an intrusion has occurred. The traces of activity can be collated from audit trails or logs, network monitoring or a combination of both. Once the data regarding a relevant aspect of the behavior of the system are collected, the classification stage starts. Intrusion detection classification techniques can be broadly catalogued in the two main groups: misuse intrusion detection, and anomaly intrusion detection. The first type of classification technique searches for occurrences of known attacks having particular signatures, and the second type searches for a departure from normality. Some of the newest intrusion detection tools incorporate both approaches.

Some recent systems have employed dynamic software measurement techniques, but they either make a decision instantaneously (at every measurement), or they aggregate measurements (either by time or by number of observations) and perform analyses on aggregates. Techniques that make a decision at every measurement point should be very fast, because they can potentially be called thousands of times per second. This performance constraint severely limits the detection accuracy of such techniques. On the other hand, techniques that only consider aggregated system behavior can have a significant latency between the time of intrusion and the time of detection due to the aggregation delay.

There remains a need for improved techniques.

BRIEF SUMMARY OF THE INVENTION

The present invention shows how to use a combination of analysis techniques (detectors) to improve over the detection accuracy of instantaneous detectors without the latency inherent in simple aggregation-based detection. By cascading detectors, fast algorithms are used to weed out normal behavior very quickly, while more complex algorithms are run preferably only when there is a good possibility that something is wrong. The complex algorithms may also be run periodically to provide additional assurance that no abnormal behaviors are occurring or have occurred. Multiple detection algorithms may also be combined in parallel to improve the precision of detection of very specific kinds of behavior or anomalies—for example, a very precise detector for a specific kind of known assault may be combined with a general detection algorithm for divergence from previous known behavior.

An embodiment of the invention includes a method of detecting an intrusion into a target software system that has been instrumented to generate behavior data representing a current observation or observation aggregate. The method begins by determining whether the current observation or observation aggregate warrants a second level examination; preferably, this determination is made by processing the current observation or observation aggregate through a first level detection algorithm that provides a first or "provisional" indication of a possible intrusion. If a result of executing the first level detection algorithm indicates that the current observation or observation aggregate warrants a second level examination, the method continues by processing the current observation or observation aggregate through at least one or more second level detection algorithms to provide a second, more definite indication of a possible intrusion. The observation aggregates used by the first and second level detection algorithms may be the same or different. The first and second level detection algorithms may be executed in the same or different systems, machines or processors. The target software system operation may be suspended as the current observation or observation aggregate is processed through the one or more second level detection algorithms. A given action (e.g., sending an alert, logging the event, activating a countermeasure, or the like) may be taken if the result of the second level examination indicates a possible intrusion.

In certain circumstances, such as where a first level determination can be made with high confidence that an anomaly exists or is executing, it may not be necessary to fully perform the second level determination, or to perform the second level determination at all.

The present invention is not limited to using the above-described multi-level or multi-stage technique just for intrusion detection. More generally, the technique may be generalized for use in detecting an anomaly in a given behavior of the target software system. In this context, the invention also contemplates the further step of conditionally suspending a given operation of the target software system that is suspected of causing the anomaly while executing the one or more second level detection algorithms. The execution of the target software system may continue despite the possible anomaly while the second level examination is performed.

Preferably, the first level detection algorithm has a computational-efficiency that is greater than a computational-efficiency of the second level detection algorithm. (This is not a limitation, however). In an illustrative embodiment, computational efficiency is measured as a given function of memory and processing requirements. Thus, for example, the first level detection algorithm may use non-floating point arithmetic operations while the second level detection algorithm uses floating point arithmetic operations. Alternatively, the first level detection algorithm may use single precision floating point arithmetic operations while the second level detection algorithm uses double precision floating point arithmetic operations. Generalizing even further, the first level may implement an approximation to a complex algorithm while the second level implements the complex algorithm itself.

In operation, a given first level detection algorithm computes a metric (a value or a set of values) by processing the current observation or observation aggregate. This metric may then be compared against a given threshold value to determine whether the current observation or observation aggregate warrants the second level examination. In a representative (but non-limiting) embodiment, the first level detection algorithm implements a given mathematical process using non-floating point computations to determine whether the current observation or observation aggregate warrants the second level examination. The given mathematical process may be a Markov model process, a frequency threshold process, an ellipsoidal model process, or the like.

As also described, the given second level detection algorithm typically will have more computational requirements, although this is not a strict limitation of the invention. The one or more second level detection algorithms preferably are selected from a set of mathematical models or algorithms that are executed using floating-point computations and that include: ellipsoidal models, k-means models, decision tree models, support vector machine (SVM) models, Markov process models, correlation factor models, frequency threshold models, ellipsoidal models, and combinations thereof. More generally, the first level detection algorithm is a coarse clustering or pattern matching algorithm and the second level detection algorithm is a fine clustering or pattern matching algorithm.

As is well-known, a target software system may be conveniently characterized as operating in one of several modes: a kernel mode, and a user mode. Typically, a kernel mode refers to the situation where given instructions, program sequences or code portions have direct access to all memory, including the address spaces of all user-mode processes and applications, and to hardware. In contrast, user mode refers to the typical software system processing mode in which applications run. Typically, where given instructions, program sequences or code portions execute in kernel mode, such code is run within a protected memory or space. According to an illustrative embodiment of the present invention, the first level detection algorithm is executed in the kernel mode and at least one second level detection algorithm is executed in the user mode.

According to an illustrative embodiment of the invention, the step of processing the current observation or observation aggregate through at least one or more second level detection algorithms processes the current observation or observation aggregate through at least a pair of second level detection algorithms whose outputs are combined according to a given function to provide the second, more definite indication of the possible intrusion. Although not meant to be limiting, the given function is selected from a set of functions, for example, linear functions, non-linear functions, and logical combinations of linear functions and non-linear functions. The outputs may be combined concurrently or otherwise.

According to a more generalized embodiment, a current observation or observation aggregate is processed during a first level examination through a set of one or more fast algorithms, e.g., in a cascade manner. If the current observation or observation aggregate triggers a given threshold for a given fast algorithm, a next fast algorithm is tested, and the process iterates. If the threshold for each fast algorithm is triggered (and the thresholds may vary), a second level examination may be initiated. During the second level examination, the current observation or observation aggregate is processed through a set of one or more sophisticated algorithms, e.g., in a cascade manner. If the current observation or observation aggregate triggers one or more thresholds for a given sophisticated algorithm, a next sophisticated algorithm is tested, and the process iterates. If the thresholds (as the case may be) for each sophisticated algorithm are triggered (and the thresholds may vary), a given action indicative of an intrusion or anomaly is taken. Preferably, the first level examination occurs in kernel mode while the second level examination occurs in user mode.

The principles of the present invention are not limited to multi-level examinations. Multiple algorithms may be executed together within a single examination level, with the individual results then analyzed to obtain a composite result or output indicative of intrusive or anomalous behavior. As a representative example, the system may run algorithms in parallel to analyze different types of characteristics embedded in given data, e.g., running a temporal-based algorithm (e.g., a Markov model) to examine sequence or temporal characteristics, and running frequency-based (e.g., cluster analysis algorithms) to analyze frequency clustering. Of course, the system can also run the same algorithm in parallel to get similar information by analyzing data for different time periods, with the results then analyzed. In addition, the system can run algorithms in parallel to explore different types of machine, device or program features. Thus, in an illustrative embodiment, there may be a examination level in which a set of n algorithms are executed, with each algorithm testing against a different characteristic or feature, and their respective outcomes evaluated together (e.g., against a given threshold) to make a decision. A threshold check may be simple or complex. Thus, for example, complex decision machines or logic made be used for making a decision, even within a given examination level. Examples of such decision machines include Bayesian networks or decision tree models to determine the probability that intrusive or anomalous behavior has occurred, cluster analysis algorithms applied to a composite vector of observation analysis results, or the like.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
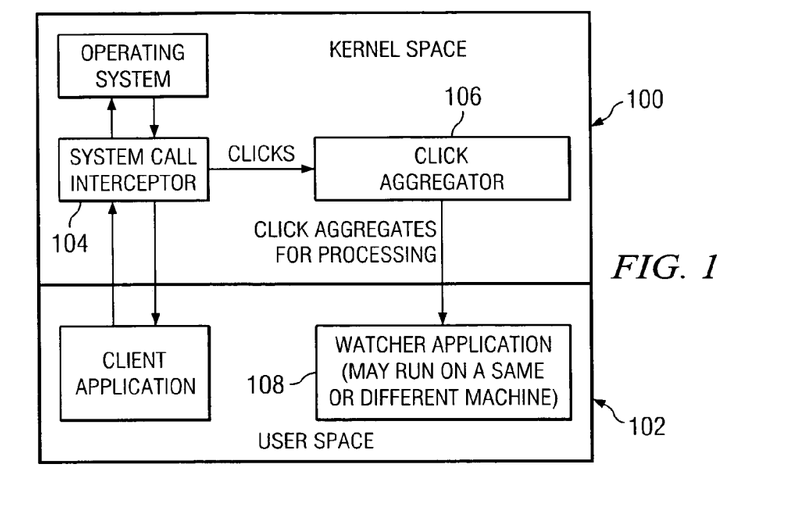
FIG. 1 is a simplified block diagram of a first embodiment of the present invention as implemented in a system call interception system.

FIG. 1 illustrates one illustrative embodiment of the present invention. In this embodiment, an interface between a software system kernel space 100 and user space 102 includes a system call interceptor 104 and a click or observation aggregator 106 that together determines whether a current observation or observation aggregate warrants a second level examination; preferably, this determination is made by processing the current observation or observation aggregate through a first level detection algorithm that provides a first, provisional indication of a possible intrusion. If a result of executing the first level detection algorithm indicates that the current observation or observation aggregate warrants a second level examination, the aggregator 106 continues by processing the current observation or observation aggregate through at least one or more second level detection algorithms to provide a second, more definite fine grain indication of a possible intrusion. Although the click aggregator 106 is shown operating in kernel space, more typically the second level examination will takes place in user space. The code running in user space can generally support higher computational requirements as measured in terms of memory and processing demands as compared to the code that runs in kernel space. The click aggregator provides an output to a watcher application 108, which runs the second level algorithms and may be running on the same machine or otherwise available on a remote machine.

Although FIG. 1 illustrates the capture of execution behavior at a system call interface, this is not a limitation. The execution behavior may be captured at other interfaces, such as at a function call, at code branch points, and the like.

Figure 2:
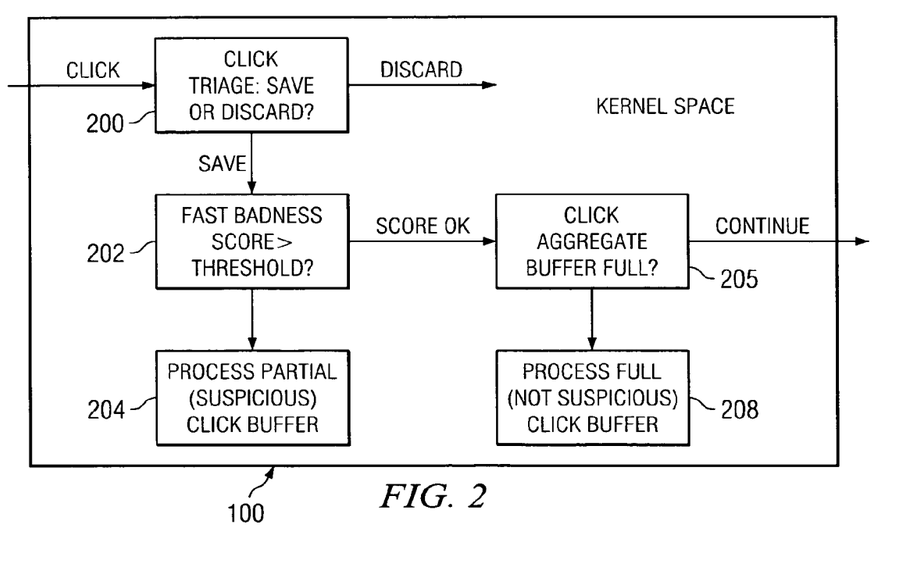
FIG. 2 is a simplified representation of the click aggregator and processing logic components of FIG. 1.

FIG. 2 is a simplified block diagram of the-click aggregator and processing logic. In general, a click may be thought of as an observation of execution behavior. When a click arrives, a test is performed at step 200 to determine whether it should be evaluated. Typically, the mechanism evaluates all clicks, but there may be situations (still within the scope of the invention) in which observations of certain execution behavior may not be evaluated, e.g., a very frequent behavior, a behavior that is proven always to be benign, or a behavior the further processing of which may potentially create undesirable artifacts. If the outcome of the test at step 200 indicates that the click should be evaluated, the click is saved, preferably in a ring buffer (or similar structure), and evaluated using an algorithm that takes into consideration prior execution behaviors (already present in the ring buffer) to produce a score value. Because in this illustrative embodiment the score is to be used for detecting "bad behavior" using fast algorithm(s), it is sometimes referred to as a "fast badness score." A test is performed at step 202 to determine whether this fast badness score is greater than a given threshold. In the illustrated embodiment, the threshold is predetermined in some off-line manner, e.g., by testing the algorithm with different loads. If the fast badness score is greater than the given threshold, the routine branches to step 204 to process the click buffer, which contains suspicious behavior. If, however, the outcome of the test at step 202 indicates that the fast badness score is not greater than the given threshold, the routine branches to step 206 where a test is performed to determine whether the buffer is full. If the buffer is not full, the routine continues. If the buffer is full, the routine continues at step 208 to process the click buffer to do a periodic check (e.g., using more complex algorithms) to ensure that no suspicious behavior has escaped detection. The processing of the task whose execution behavior is being analyzed may be put of hold while the evaluation takes place.

Figure 3:
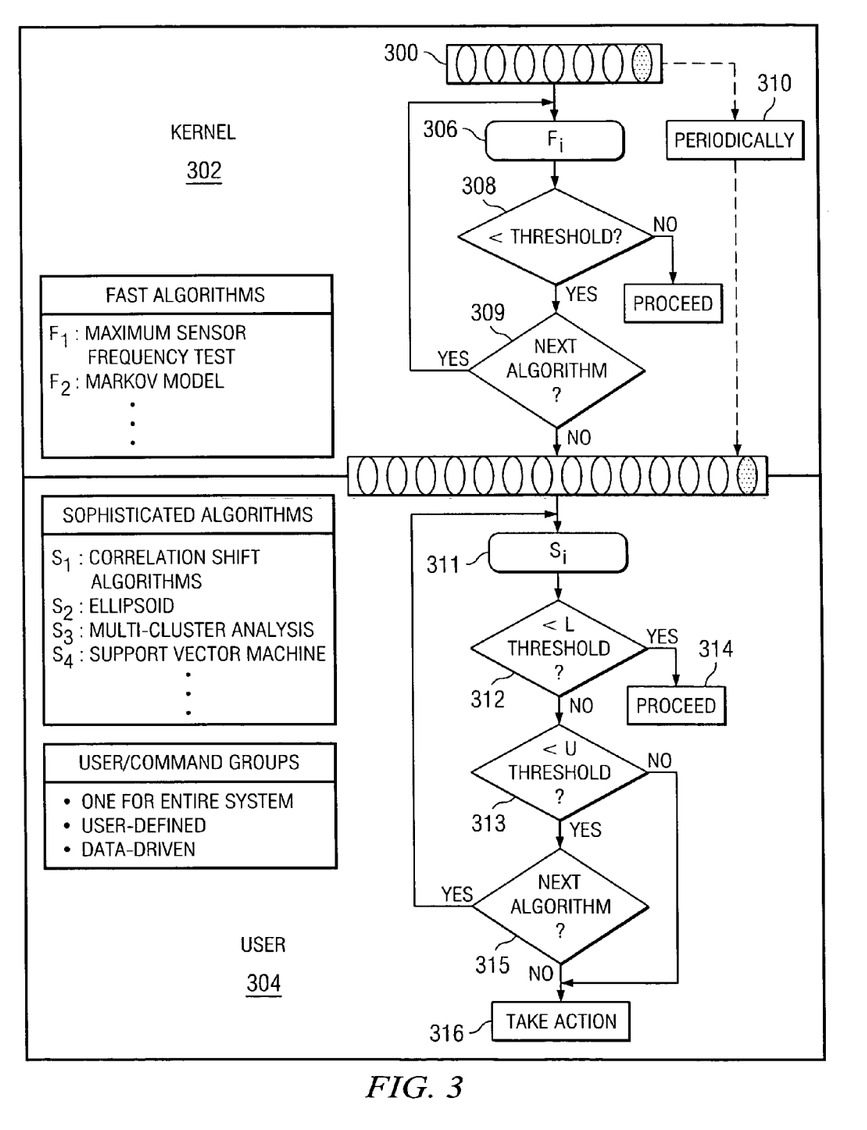
FIG. 3 is a high level representation of a more generalized implementation of the present invention, wherein each processing level includes a set of one or more cascaded algorithms.

FIG. 3 illustrates a further generalization of the invention. As illustrated, a current observation or observation aggregate 300 is processed through a first level examination 302 and, optionally, through a second level examination 304. For representative purposes, the first level examination 302 occurs in kernel mode, while the second level examination 304 occurs in user space. There may be multiple algorithms at a given level. The first level examination 302 involves one or more fast algorithms $F_i$, with two such algorithms being shown, e.g., $F_1$, an independent sensor frequency analysis, and $F_2$, a fast approximation Markov model. In this examination, the current observation or observation aggregate 300 is applied to the function $F_i$ (block 306) with the output then being tested against a threshold 308. If the threshold is not met, then the routine terminates (as indicated by the "Proceed" statement, which indicates that the application that is generating the data should continue execution). If the threshold is met, a test 309 is performed to determine whether a next $F_i$ algorithm should be used for further evaluation. If so, the routine cycles back to step 306 and the first level examination iterates against the next fast algorithm (e.g., $F_2$). Of course, each fast algorithm may have a different threshold value or constraint, and each may process a different, but related, observation aggregate. The particular identity of the fast algorithm and the described sequence of these algorithms are merely representative. As also seen in FIG. 3, the current observation or observation aggregate 300 may also be tested periodically (through the one or more fast algorithm(s) $F_i$) as indicated by the block 310. If the current observation or observation aggregate has triggered the applicable threshold in all of the fast algorithm(s) $F_i$ (e.g., $F_1$, then $F_2$, and so forth), the second level examination 304 is initiated.

Generalizing further, the second level examination can be triggered if scores from M out of N algorithms in the first level examination exceed a given threshold (for the respective algorithms).

The second level examination 304 comprises a set of one or more "sophisticated" algorithms $S_i$, which in this illustrated example includes $S_1$, a correlation shift algorithm, $S_2$, an ellipsoid algorithm, $S_3$, a multi-cluster analysis, $S_4$, a support vector machine, a sequence analysis algorithm (not shown), and so forth. As described above, the particular identity and sequence of these sophisticated algorithms is merely illustrative. In this embodiment, the observation or observation aggregate is evaluated by a given $S_i$ algorithm (block 312) with the output thereof (which is a value) compared to a lower threshold value $L_i$. This is block 314. If the test at block 314 is not triggered, the second level examination ends, with the application continues to "Proceed" as described above. If, however, the output of the test at block 314 indicates that a lower threshold has been exceeded, the output (of the given $S_i$ algorithm) is compared against an upper threshold value $U_i$. This is block 316. (The particular values of $L_i$ and $U_i$ may vary depending on the type of algorithm used, of course). If the value generated by executing the $S_i$ algorithm is greater than the upper threshold value, then a given action 318 is initiated because an intrusion (or anomaly) is indicated.

If the result of executing the given $S_i$ algorithm is less than the upper threshold value $U_i$, the routine continues at step 320 to test whether any additional sophisticated $S_i$ algorithm remains to be tested. If the result of the test at step 320 indicates that there is a next sophisticated algorithm, the routine iterates and repeats the above-described process. When the result of the test at step 320 is negative, the routine also branches and takes the given action 318.

Thus, FIG. 3 illustrates how multiple algorithms can be used in a cascading fashion (even within a given examination level). In the second level examination, each algorithm also uses tests against multiple thresholds, although this is not a limitation of the invention either. In the alternative, the multiple ($F_i$ or $S_i$) algorithms compute partial scores that together may form a multi-element score or a composite aggregate score. Of course, a similar function can be implemented in kernel space as well.

Figure 4:
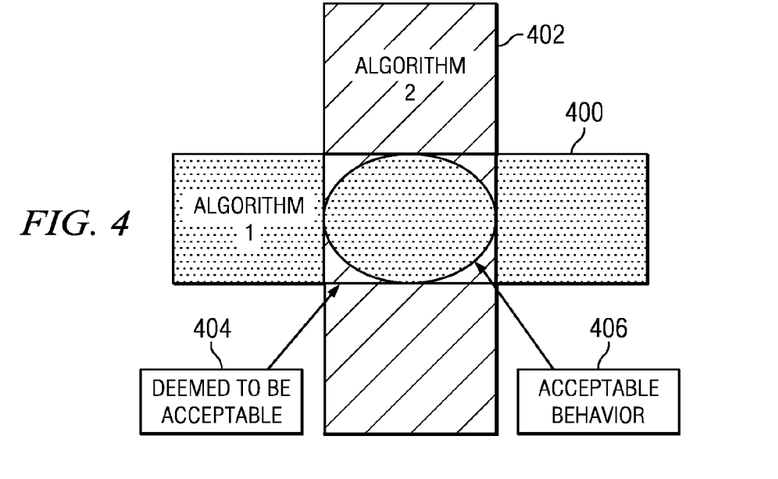
FIG. 4 illustrates how one can improve detection accuracy by executing a pair of algorithms within a given examination level.

The principles of the present invention are not limited to multi-level examinations. Multiple algorithms may be executed together within a single examination level, with the individual results then analyzed to obtain a composite result or output. This concept is illustrated generally in FIG. 4. In this illustration, algorithm 1 is executed and includes an area of acceptable behavior data illustrated by reference numeral 400. Algorithm 2 is executed (concurrently, or otherwise in "parallel"—namely, at the same examination level) and includes an area of acceptable behavior data illustrated by reference numeral 402. Because the algorithms are run in parallel (or, more generally, within the same examination level), an area of overlap 404 is then deemed to be acceptable behavior for the test, as a whole, or that area may be more narrowly constrained (as reference 406) by some policy or other metric. As a representative example, the system may run algorithms in parallel to analyze different types of characteristics embedded in given data, e.g., running a temporal-based algorithm (e.g., a Markov model) to examine sequence or temporal characteristics, and running frequency-based (e.g., cluster analysis algorithms) to analyze frequency clustering. Of course, the system can also run the same algorithm in parallel to get similar information by analyzing data for different time periods, with the results then analyzed. An example of this approach would be to run a Markov model in parallel with different window sizes. In this example, the system can then determine whether the intrusion or anomaly has appeared only recently.

Figure 5:
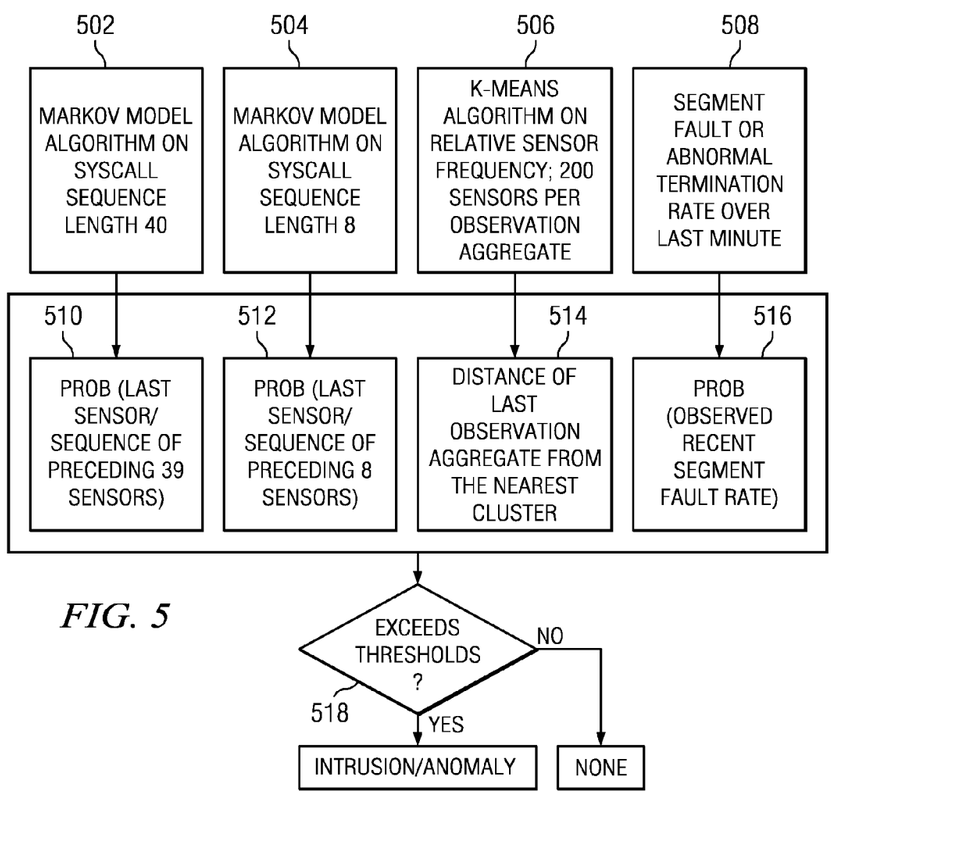
FIG. 5 illustrates a set of algorithms that are executed in parallel against given system behavior characteristics or features.

Note that the system can run algorithms in parallel to explore different types of machine, device or program features. Examples of such characteristics or features include, without limitation, resource utilization metrics, number of segment faults or abnormal terminations over a certain period, actual commands or queries being issued by users, parameters for system calls and other function calls, IP addresses, and the like. FIG. 5 illustrates a one examination level approach where a set of four (4) algorithms are executed, with each algorithm testing against a different characteristic or feature and their outcomes are evaluated together to make decision about a next step. In this example, a first algorithm 502 is a Markov model running on system call sequences of a first given length (e.g., 40), a second algorithm 504 is also a Markov model, but one that runs on system call sequences of a second given length (e.g., 8). A k-means algorithm 506 executes on relative sensor frequency (e.g., 200 sensors per observation aggregate), and a fourth algorithm 508 examines segment faults or abnormal termination rates over a given time period (e.g., one minute). The output 510 of the first algorithm 502 is an estimate of the probability of occurrence of the sequence represented by a value of a last sensor concatenated with the values from the sequence of the preceding 39 sensors. The output 512 of the second algorithm 504 is an estimate of the probability of occurrence of the sequence represented by a value of a last sensor concatenated with the values from the sequence of the preceding 7 sensors. The output 514 of the third algorithm 506 is a distance value of a last observation aggregate from a nearest cluster, and the output 516 of the fourth algorithm 508 is an estimate of the probability of observed recent segment fault rate. Of course, these algorithms are merely illustrative, as the actual algorithms used and/or the characteristics or features evaluated, can be varied. The outputs 510, 512, 514 or 516 (or some of them) may then be tested individually and together against thresholds at step 518 to generate an affirmative or negative indication of an intrusion or other anomalous behavior.

Figure 6:
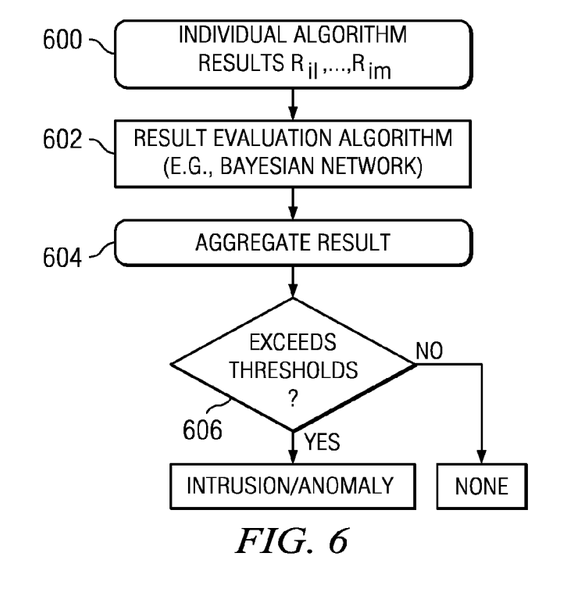
FIG. 6 is a simplified flowchart of a generalized threshold check process that may implemented within a given examination level.

The threshold check 518 in the above example may be simple or complex. In particular, the present invention also envisions use of complex decision machines or logic for making a decision, even within a given examination level. Examples of such decision machines include Bayesian networks or decision tree models to determine the probability that anomalous behavior has occurred, cluster analysis algorithms applied to a composite vector of observation analysis results, or the like. FIG. 6 illustrates a generalized threshold check process that begins at step 600 with the individual algorithm results. At step 602, the individual results are evaluated in a result evaluation algorithm (e.g., a Bayesian network). An aggregate result 604 is generated, and that result is then tested against a threshold in step 606 to produce an affirmative or negative result.

The following provides additional details on instrumentation and fast implementations of specific mathematical algorithms that may use for evaluation.

1. Instrumentation

According to the invention, a software system is instrumented to provide regular observations of its behavior. This instrumentation may take the form of simple events observed at particular program points, or the events may be more complicated, such as monitoring part (or all of) the function call stack, the values of the registers, or of some locations in memory. The program points may be selected automatically by an instrumentation system, semi-automatically using program analysis tools, or manually, and program points may be inserted into the source code or directly into the executable binary file. In addition, an Application Program Interface (API) may be instrumented, e.g., by adding a layer that generates observation events when methods in the API are called. When the client and server processing happens on different machines, the invocation protocol typically includes a procedure for making a remote procedure call (RPC) or remote method invocation (RMI), and the instrumentation can be implemented as a protocol translation layer on either the client or the server machine.

Observations, then, are either discrete events ("program point X was executed") or continuously-valued observations ("the value of variable Y was 32"). In addition, discrete events can be sampled over time to produce continuously-varying observations, such as "program point X was executed 6 times in the last 10 minutes." Of course, the above nomenclature is merely illustrative.

2. Variety of Detection Techniques

By way of additional background, a large variety of detection techniques are available in the machine-learning literature. A typical technique builds a model from a set of training data. In an operational mode, the detector compares a query against the model to produce a numerical estimate (typically a probability) of how representative this model is of this query. Multiple models can be built from multiple sets of training data (e.g. data observed on a system running Oracle vs. data observed on a system running Apache), and these detectors can be used to classify a new observation. Thus, for example, the query is classified as being most likely to be consistent with the system which the highest probability model.

Such techniques include, without limitation: sequence analysis models, moving average models, ellipsoidal models (typically using Gaussian or Poisson probability distribution functions), k-means models, decision tree models, Support Vector Machine (SVM) models, and Markov process models. As used herein, "model" is synonymous with algorithm. Techniques such as Principle Components Analysis (PCA), and factor analysis can be used to reduce the dimensionality of the parameter space and reduce computational complexity. Further, the data can be clustered in various ways to build models that are better targeted to match other characteristics of processing elements that are not directly captured by the execution behavior. Examples of such characteristics include, without limitation, command name, user id, user group id, and the like.

Common to all of these techniques are numerically complex mathematics, often done using floating-point arithmetic, which can be slow to execute, even on a modern processor. In addition, some of these techniques use continuously valued observations, which requires the aggregation of a set of observations (typically those that have occurred in the recent past) for processing. This leads to a long delay (or latency) before the monitoring process can detect that the system has deviated from its normal behavior.

Many of these techniques have a coarse approximation. Thus, for example, precise floating point calculations can be approximated by integers, typically with dramatic speed improvements. A decision tree can be pruned arbitrarily or systematically to a smaller depth, and although the resulting tree will generate probability estimates that are less accurate than an original tree, such a process requires less computational resources to score. A large matrix of sensor id frequencies can be analyzed as a set of smaller matrices of highly correlated sensor ids using techniques such as Principal Component Analysis (PCA). According to a feature of the invention as has been described, a desired goal is to make a very fast judgment as to whether the current observation or observation aggregate merits a more detailed examination. It is often possible to prune a decision tree in such a way that the detection rate stays high while the false positive rate only increases by a very small amount.

3. Fast Approximations to the Ellipsoidal and Moving Average Techniques

There are a number of techniques that may be combined to allow an approximation to an ellipsoidal model to be computed very efficiently. The ellipsoidal model is approximated by a bounding box. A determination can then be made regarding whether the bounding box aligns with the coordinate axes. In particular, the technique simply asks whether any observation is below a pre-computed minimum or above a pre-computed maximum. Because (in a representative embodiment) the dimensions in the preferred embodiment are aggregate event frequencies (e.g. the number of observations of a particular event in an aggregate divided by the total number of observations in the aggregate), this test can be performed efficiently by keeping track of the number of each event type (so far) observed in this given aggregate. Each time an event type (of type i) is encountered, a click count cc[i] is incremented, and if the count exceeds a previously trained bound, then the click aggregate is immediately referred for more detailed processing.

In a representative embodiment, this technique may be further optimized as follows. Instead of computing the click count, an exponentially-decaying moving average ma is updated as follows:

```
if last_update[i] – current_time > time_threshold
    ma[i] = ma[i] / 2
ma[i] = ma[i] + 1
last_update[i] = current_time
if ma[i] > ma_threshold[i]
    (process further)
```

This function may be computed very efficiently in a modern processor. The computed moving average value ma[i] is then compared against the limit computed during training, and if the limit is exceeded, the click aggregate is referred for more detailed processing.

4. Fast Approximations for Markov Processes

A stationary Markov process model estimates the probability distribution of a current observation obs_i based on the assumption that the only influencing factors are the k observations in the recent past:

$$P(obs\_i=j|obs\_i-k=h\_0,\ldots,obs\_i-1=h\_k-1)$$

Then, the probability of observing a sequence of n observations is generally:

$$(product\_i)\ P(obs\_i=j|obs\_i-k=h\_0,\ldots,obs\_i-1=h\_k-1)$$

To update this probability on every observation, the probability needs to be computed efficiently. One well-known technique is to compute the logarithm of the probability instead of the probability directly, and add log probabilities.

Models of this form often require storage space that is proportional to $n^{\wedge}(k+1)$, where n is the number of different observation types. If sufficient training data is available, this model can be built for values of k up to 5-10, but the model quickly becomes difficult to obtain accurate probability estimates for the low-frequency histories. There are well-known techniques for pruning (e.g. using cutoffs or statistical tests) the $n^{\wedge}k$ probability distributions and for smoothing these estimates, including adding a small value (1 or epsilon) to either the count or frequency estimates, interpolation with a back-off model (typically with a smaller history length k'), and Good-Turing smoothing. Unfortunately, these techniques result in models that are too computationally expensive to be-performed on every observation. The pruning techniques typically result in a complicated tree-like data structure with a hash table at many internal nodes. Many of the interpolation models typically involve computations such as: lambda*P_k (obs_i)+(1-lambda*P_k'(obs_i)), which do not have an efficient computational analog in log-probability space.

In an illustrative embodiment, a Markov process is trained on histories of length 4-8, depending on the availability of training data, and the P_k(obs_i|history) probability distributions are clustered statistically. This results in a small number of clusters. In an illustrative embodiment, the number of clusters is limited to 256, allowing the cluster ids to be represented in one machine byte. For each cluster, the log probabilities are scaled and quantized to fit into one byte. For each cluster ID cid, then, this results in a (dense) map from sensor id i to next_cluster_id[cid][i] and scaled_log_prob[cid][i], totaling about 4000 bytes (assuming 2000 sensors) per cluster, or about 1 megabyte of storage.

Then, updating the Markov model probability estimate involves the following algorithm:

```
aggregate_scaled_log_prob = aggregate_scaled_log_prob +
    scaled_log_prob[ history_cluster_id ] [obs_i]
history_cluster_id = next_cluster_id[ history_cluster_id ][obs_i]
if aggregate_scaled_log_prob > markov_threshold
    (process further)
```

When the aggregate_scaled_log_prob value exceeds a trained threshold, the click aggregate is referred for more detailed processing.

Further details about Markov models are widely available. These models are sometimes referred to as probabilistic finite state machines or Markov chains.

5. Detailed System Description

In an illustrative embodiment, the inventive method begins with a software system that has been instrumented to produce events, either at internal program points or at the interfaces between components. The observed event streams are used to train detection models. Some of these models are then used by very fast detectors, which process every event, occasionally detecting that the current event, or the recent past history, is out of the previously observed range of normal events. In this embodiment, event streams are referred for detailed processing unconditionally every 500-1000 events during normal processing, approximately 100 events after certain system calls (e.g. fork), and on process exit. The exponentially-decaying moving average thresholds are tuned so that during normal processing, the moving average for every event will not exceed its threshold more than 99% of the time, and the approximate Markov process model is tuned to produce an alert whenever the probability of the recent history is less than $2^{\wedge}-1000$. In addition, looser thresholds are trained, and if both the moving average and the Markov probability exceed their loose thresholds, the event stream is referred for further processing.

The following algorithm may be used to implement this functionality:

```
num_clicks_until_next_batch = num_clicks_until_next_batch – 1
if (num_clicks_until_next_batch == 0) or exiting
then
    (process further; reason = click count exceeded)
if (ma[i] < loose_ma_threshold[i]) and
    (aggregate_scaled_log_prob < loose_markov_threshold)
then
    (stop processing this event)
else if (ma[i] > tight_ma_threshold[i])
then
    (process further; reason = ma exceeded tight threshold)
else if (aggregate_scaled_log_prob > tight_markov_threshold)
then
    (process further; reason = exceeded tight markov threshold)
else if (ma[i] > loose_ma_threshold[i]) and
    (aggregate_scaled_log_prob > loose_markov_threshold)
then
    (process further; reason = exceeded both loose thresholds)
```

Whenever the current event triggers the "process further" logic above, a packet is created consisting of the recent events observed, e.g. for the current process or transaction, and any relevant metadata. In the illustrative embodiment, the packet preferably contains the process id, the user id, and the process name.

This packet is then referred to the detailed analytics engine, which can employ recognition techniques such as those outlined above to determine a detailed analysis of the packet. In the illustrative embodiment of the current invention, the system selects one of a small number of models based on the metadata in the packet (e.g. the running-as-root model, the Oracle model, or the generic model). Using the selected model, the system computes the minimum distance to a small number (1-5, depending on the availability and separation of the training data) of ellipsoids built using the k-means algorithm. In addition, the system computes the divergence from a pre-computed factor correlation matrix and the probability using a Markov transition model. The overall distance estimate is a linear combination of these distance estimates. Finally, the system computes an estimate of the danger of the recent events to the protected computer system using a previously-computed function that maps from event types to a danger level, and a similar estimate of the virulence or propensity to propagate using a function from event types to danger levels.

The present invention may incorporate an alert system that includes a monitoring console having a graphical user interface.

Variants

Figure 7:
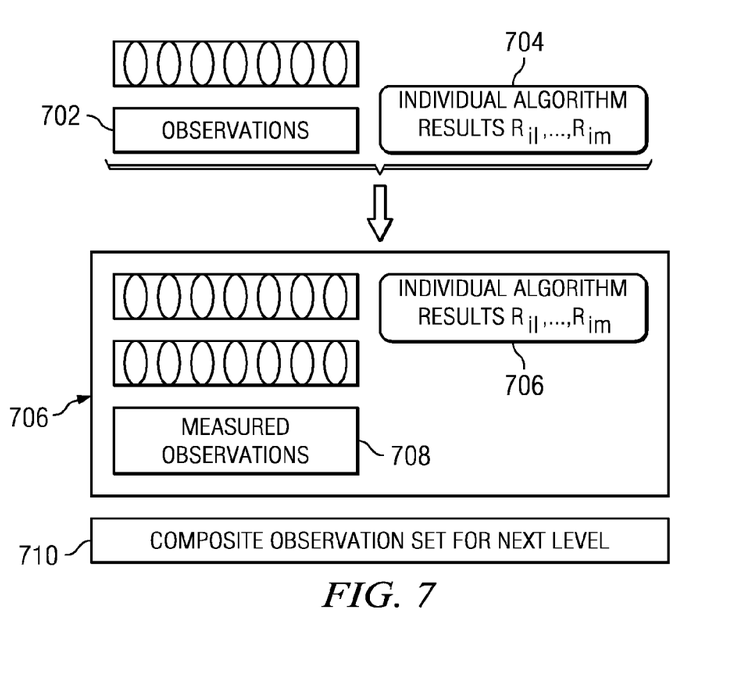
FIG. 7 illustrates how an observation aggregate may be enhanced with the results from prior analyses of the observations, allowing algorithms executed at a next level to benefit from and take into account the results of algorithms executed earlier.

Another variation of the present invention is illustrated in FIG. 7. In this example, when subsequent algorithms are executed, it may be desirable to use the results from previous analyses for analysis along with the original observation or observation aggregate(s). In other words, the observation aggregate is enhanced with the results from the previous analyses. In FIG. 7, both the observations 702 and the individual algorithm results 704 are applied as inputs to an algorithm 706. The algorithm 706 uses the measured observations 708 and the individual algorithm results to generate a composite observation set 710 for use in either producing an output at the examination level itself, or as the input for a next examination level.

While discussing algorithms, we have primarily used statistical algorithms for illustrations. Other algorithms are within the scope of the invention as well. Thus, for example, the present invention may also be implemented using non-statistical means of analysis in the first and second level detection algorithms. For example, a given detection algorithm may use a table of risk values pre-assigned to various sensor data/ids. Two examples of this would be system calls, (setuid=high, select=low, open=moderate), and paths accessed, (/tmp is low,/etc/is high). The table is consulted to provide an "objective" risk metric for the observed behavior. Generalizing, any rules-based analysis technique may be used.

An extension of this concept is the integration of signature based content inspection, e.g., as a second level detection algorithm.

A further extension is that the table of risk values is tuned or augmented based on positively identified events.

Another variant is the use of sensors to detect events that are known to be bad a priori in the first level detection algorithm.

An extension of this is the use of a table of sensors that are known to have high risk in the first level detection algorithm.

Generalizing, as used herein, an "algorithm" may be of any type including, without limitation, a statistical algorithm, a temporal algorithm, a rules-based algorithm (having pre-defined rules), or any other type.

As used herein, a given "observation aggregate" may be different for different algorithms running at different levels and, as noted above, it may include values computed by a given algorithm executed earlier.

Further, when different algorithms are executed in "parallel," it is not required that parallel processors or systems or parallel processing techniques be used—the term parallel is used that multiple algorithms are run independently and their results analyzed together.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Although the present invention has been described in the context of a computer system, this is not a limitation of the invention either. The techniques of the invention may be implemented in or for other devices including, without limitation, embedded systems, mobile devices of any kind, or the like.

Although the present invention has been described with illustrative embodiments, many variants are within the scope of the appended claims. Thus, for example, each examination layer (provisional or more definite) may include one or more algorithms. When two or more algorithms are executed within a given examination layer, the algorithms may be executed in cascade (as in FIG. 3), in parallel, or otherwise. The outputs for a given pair of such algorithms may be considered as partial scores that together form a multi-element score or a composite aggregate score. Moreover, while various fast and sophisticated algorithms have been described, these examples are not to be construed as limiting the general principles of the invention. Thus, other algorithm techniques, such as those based on neural networks, fuzzy arithmetic, diagonal Gaussian models, perceptrons, and the like, may be used as well.

Also, one of ordinary skill will appreciate that the terms "provisional" and "more definite" should be broadly construed. As used herein, a provisional indication provides a first (an initial) "tentative" (or "coarse") indication, albeit very quickly, while a more definite indication is one that is thereafter provided, perhaps with more accuracy (due to the use of additional computational complexity) and conclusiveness.

Having thus described our invention, what is claimed is as follows:

1. A method of detecting an intrusion into a target software system, comprising:
   instrumenting the target software system to generate event streams representing a current observation or observation aggregate;
   processing the current observation or observation aggregate through a first level detection algorithm that provides a first, provisional indication of a possible intrusion;
   determining whether the current observation or observation aggregate warrants a second level examination, wherein the determining step is performed as the event streams are being generated and by the first level detection algorithm computing an approximation of a given function; and
   if a result of executing the first level detection algorithm indicates that the current observation or observation aggregate warrants a second level examination, processing the current observation or observation aggregate through at least one or more second level detection algorithms to provide a second, more definite indication of a possible intrusion;
   suspending operation of the target software system during the step of processing the current observation or observation aggregate through the one or more second level detection algorithms;
   wherein the suspending step conditionally suspends a given operation of the target software system that is suspected of being a target of the intrusion.

2. The method of detecting an intrusion as described in claim 1 wherein the first level detection algorithm has a computational-efficiency that is greater than a computational-efficiency of the second level detection algorithm, wherein computational efficiency is measured as a function of memory and processing requirements.

3. The method of detecting an intrusion as described in claim 2 wherein the one or more second level detection algorithms use floating point arithmetic operations.

4. The method of detecting an intrusion as described in claim 1 wherein the step of processing the current observation or observation aggregate through at least one or more second level detection algorithms processes the current observation or observation aggregate through at least a pair of second level detection algorithms whose outputs are analyzed according to a function to provide the second, more definite indication of the possible intrusion.

5. The method as described in claim 4 wherein the function for analyzing the outputs to provide the second, more definite indication of the possible intrusion is selected from a set of functions, namely, linear functions, non-linear functions, rules-based functions, and logical combinations thereof.

6. The method as described in claim 4 wherein the outputs are combined according to the function concurrently.

7. The method of detecting an intrusion as described in claim 1 wherein the first level detection algorithm computes a metric from the current observation or observation aggregate and compares the metric against a given threshold value to determine whether the current observation or observation aggregate warrants the second level examination.

8. The method of detecting an intrusion as described in claim 1 wherein the first level detection algorithm uses non-floating point computations to determine whether the current observation or observation aggregate warrants the second level examination.

9. The method of detecting an intrusion as described in claim 8 wherein the first level detection algorithm is a Markov model process or an ellipsoidal model process.

10. The method of detecting an intrusion as described in claim 1 wherein the one or more second level detection algorithms are selected from a set of mathematical models that are executed using floating-point computations and that include: ellipsoidal models, k-means models, decision tree models, support vector machine (SVM) models, Markov process models, and combinations thereof.

11. The method of detecting an intrusion as described in claim 1 further including the step of executing the one or more second level detection algorithms in a distinct machine.

12. The method of detecting an intrusion as described in claim 1 further including the step of taking a given action if the result of the second level examination indicates a possible intrusion.

13. A method of detecting an anomaly in a behavior of a target software system, comprising:

instrumenting the target software system to generate event streams representing a current observation or observation aggregate;

determining whether the current observation or observation aggregate warrants a second level examination by processing the current observation or observation aggregate through a set of one or more first level detection algorithms to provides a first provisional indication of a possible anomaly, wherein the determining step is performed as the event streams are being generated and by at least one first level detection algorithm computing an approximation of a given function; and if a result of executing the set of one or more first level detection algorithms indicates that the current observation or observation aggregate warrants a second level examination, processing the current observation or observation aggregate through at least one or more second level detection algorithms to provide a second, more definite indication of a possible anomaly;

wherein the target software system comprises a kernel mode and a user mode, at least one first level detection algorithm being executed in the kernel mode and at least one second level detection algorithm being executed in the user mode;

wherein at least one of the second level detection algorithms is executed in a processor distinct from a processor that executes the first level detection algorithm.

14. The method as described in claim 13 further including the step of conditionally suspending a given operation of the target software system that is suspected of causing the anomaly while executing the one or more second level detection algorithms.

15. The method as described in claim 13 wherein at least one of the second level detection algorithms is executed in an off-line process.

16. The method as described in claim 13 further including the step of processing the current observation or observation aggregate through at least one or more second level detection algorithms to provide a second, more definite indication even if executing the one or more first level detection algorithms does not indicate a possible anomaly.

17. The method as described in claim 13 wherein the one or more first level detection algorithms are executed in a protected memory area of the kernel.

18. The method as described in claim 13 wherein the step of processing the current observation or observation aggregate through at least one or more second level detection algorithms processes the current observation or observation aggregate through at least a pair of second level detection algorithms whose outputs are analyzed according to a function.

19. The method as described in claim 18 wherein the function for analyzing the outputs is selected from a set of functions, namely, linear functions, non-linear functions, rules-based functions, and logical combinations thereof.

20. The method as described in claim 13 wherein execution of the target software system continues despite the possible anomaly while the second level examination is performed.

21. A method of detecting an intrusion into a target software system comprises a kernel mode and a user mode, comprising:

instrumenting the target software system to generate event streams representing a current observation or observation aggregate;

in a first level examination, determining whether the current observation or observation aggregate warrants a second level examination by processing, in a sequential manner, the current observation or observation aggregate through a set of first level detection algorithms executing in the kernel mode and that provides a first indication of a possible intrusion, wherein the determining step is performed as the event streams are being generated and by at least one first level detection algorithm computing an approximation of a given function;

if a result of the first level examination indicates that the current observation or observation aggregate warrants a second level examination, processing the current observation or observation aggregate through at least one or more second level detection algorithms executing in the user mode to provide a second indication of a possible intrusion; and as a result of the second level examination, taking a given action;

wherein the one or more second level detection algorithms are selected from a set of mathematical models that are executed using floating-point computations and that include:

ellipsoidal models, k-means models, decision tree models, support vector machine (SVM) models, Markov process models, and combinations thereof.

22. The method of detecting an intrusion as described in claim 21 wherein the given action generates an output indicating that an intrusion has occurred or initiates a given counter action.

23. The method of detecting an intrusion as described in claim 21 wherein one of the first level detection algorithms computes a metric from the current observation or observation aggregate and compares the metric against a given threshold value to determine whether the current observation or observation aggregate warrants the second level examination.

* * * * *